(12) United States Patent
Dournov et al.

(10) Patent No.: US 8,935,375 B2
(45) Date of Patent: Jan. 13, 2015

(54) INCREASING AVAILABILITY OF STATEFUL APPLICATIONS

(75) Inventors: Pavel Dournov, Sammamish, WA (US); Luis Irun-Briz, Sammamish, WA (US); Maxim Khutomenko, Sammamish, WA (US); Corey Sanders, Seattle, WA (US); Gaurav Gupta, Seattle, WA (US); Akram Hassan, Sammamish, WA (US); Ivan Santa Maria Filho, Los Gatos, CA (US); Ashish Shah, Sammamish, WA (US); Todd Pfleiger, Seattle, WA (US); Saad Syed, Redmond, WA (US); Sushant Rewaskar, Redmond, WA (US); Umer Azad, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 13/323,213

(22) Filed: Dec. 12, 2011

(65) Prior Publication Data
US 2013/0151681 A1 Jun. 13, 2013

(51) Int. Cl.
*G06F 15/173* (2006.01)
*G06F 15/16* (2006.01)
*G06F 9/46* (2006.01)

(52) U.S. Cl.
USPC ............................ 709/223; 709/201; 718/103

(58) Field of Classification Search
None
See application file for complete search history.

(56) References Cited

U.S. PATENT DOCUMENTS

| | | | |
|---|---|---|---|
| 6,381,627 B1 * | 4/2002 | Kwan et al. | 709/201 |
| 6,411,966 B1 * | 6/2002 | Kwan et al. | 1/1 |
| 6,865,591 B1 | 3/2005 | Garg et al. | |
| 7,103,874 B2 | 9/2006 | McCollum et al. | |
| 7,143,167 B2 | 11/2006 | Kampe et al. | |
| 7,302,634 B2 * | 11/2007 | Lucovsky et al. | 715/200 |
| 7,681,075 B2 | 3/2010 | Havemose et al. | |
| 8,325,924 B2 * | 12/2012 | Acar et al. | 380/277 |
| 2004/0225952 A1 * | 11/2004 | Brown et al. | 714/819 |
| 2005/0210152 A1 | 9/2005 | Hawes | |
| 2006/0080656 A1 * | 4/2006 | Cain et al. | 717/174 |

(Continued)

OTHER PUBLICATIONS

Li, et al., "TANSO: A Componentized Distributed Service Foundation in Cloud Environment", In Proceedings of Network Operations and Management Symposium (NOMS), 2010 IEEE, Apr. 19-23, 2010, 8 pages.

(Continued)

*Primary Examiner* — Ranodhi Serrao
(74) *Attorney, Agent, or Firm* — Ben Tabor; David Andrews; Micky Minhas

(57) ABSTRACT

Methods, systems, and computer-readable media for facilitating coordination between a fabric controller of a cloud-computing network and a service application running in the cloud-computing network are provided. Initially, an update domain (UD) that includes role instance(s) of the service application is selected, where the service application represents a stateful application is targeted for receiving a tenant job executed thereon. The process of coordination involves preparing the UD for execution of the tenant job, disabling the role instance(s) of the UD to an offline condition, allowing the tenant job to execute, and restoring the role instance(s) to an online condition upon completing execution of the tenant job. Preparing the UD includes notifying a management role established within the service application of the fabric controller's intent to execute the tenant job and receiving a management-role response communicating a presence of replications of internal state(s) of the role instance(s) affected by the tenant job.

20 Claims, 8 Drawing Sheets

(56) References Cited

U.S. PATENT DOCUMENTS

| | | | |
|---|---|---|---|
| 2006/0111880 A1* | 5/2006 | Brown et al. | 703/1 |
| 2007/0061779 A1 | 3/2007 | Dowedeit et al. | |
| 2008/0263196 A1 | 10/2008 | Kansal et al. | |
| 2010/0042720 A1 | 2/2010 | Stienhans et al. | |
| 2010/0088150 A1 | 4/2010 | Mazhar et al. | |
| 2010/0208898 A1* | 8/2010 | Acar et al. | 380/280 |
| 2010/0228819 A1 | 9/2010 | Wei | |
| 2010/0235903 A1 | 9/2010 | Carter et al. | |
| 2011/0202657 A1 | 8/2011 | Chang | |
| 2012/0102480 A1* | 4/2012 | Hopmann et al. | 717/172 |

OTHER PUBLICATIONS

Chandra, et al., "A Global-State-Triggered Fault Injector for Distributed System Evaluation", In Proceedings of Transactions on Parallel and Distributed Systems, IEEE, vol. 15, Issue 7, Jul. 2004, 13 pages.

Treaster, et al., "A Survey of Fault-Tolerance and Fault-Recovery Techniques in Parallel Systems", In Proceedings of ACM Computing Research Repository (CoRR), Jan. 1, 2005, 11 pages.

International Search Report and Written Opinion for PCT/US2012/067151, mailed Mar. 27, 2013.

* cited by examiner

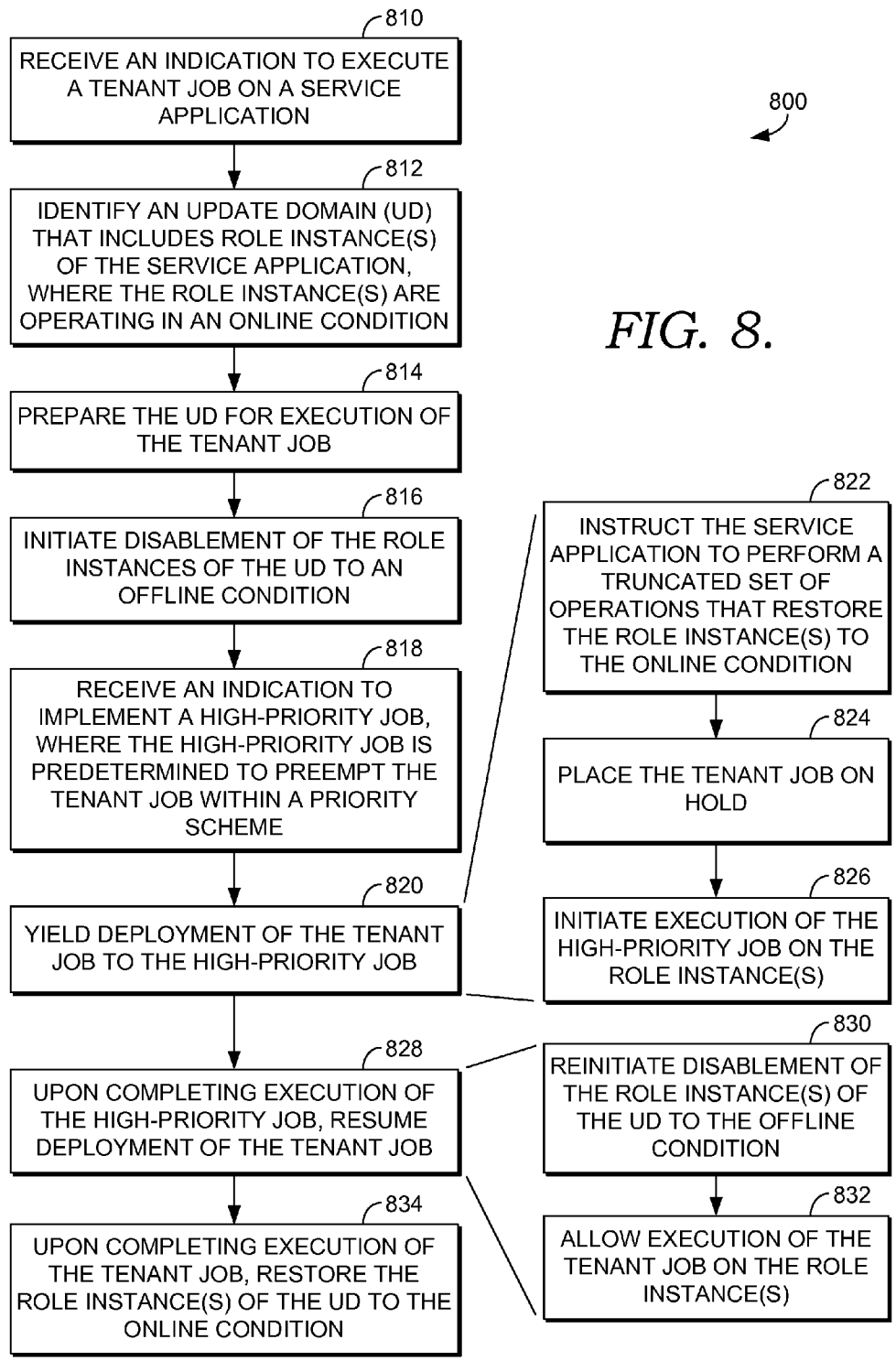

INCREASING AVAILABILITY OF STATEFUL APPLICATIONS

BACKGROUND

Generally, distributed service applications are hosted in cloud-computing networks (across various nodes) and are intended primarily to promote high availability through redundancy of service-application components. These service applications are often divided into portions that include a group of service-application components. The use of these portions helps to ensure that an entire service application does not become unavailable during an update or repair to the nodes that host the service application. In operation, as these portions are pulled offline individually, a balance of the portions of the service application are allowed to continue to operate online. Thus, ideally, no lapse in availability of the service application is encountered by a user thereof.

Presently, the division of the service application is based on location-related criteria (e.g., service-application components residing on a common node within a data center) or function-related criteria (e.g., all service-application components that perform a certain role cannot be taken down at once). These criteria for grouping service-application components into portions are somewhat effective for stateless applications (i.e., volatile software that relies upon data stored outside of its components). However, these criteria are not effective for stateful applications that maintain a durable internal state, which is persisted at the service-application components. That is, using the criteria above fails to consider a present internal state of the service-application components, thereby causing potential unavailability of the service application when pulling offline a previously formed portion thereof. Accordingly, technology is introduced herein to address the above-mentioned problem of enabling high availability for distributed service applications that maintain an internal state.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for promoting high availability for service applications that maintain an internal state or portions thereof. Generally, these "stateful" service applications include portions that are distributed throughout nodes (e.g., physical machines or virtual machines) within a cloud-computing network (hereinafter "cloud"), where the nodes are housed in one or more data stores. Typically, the cloud is equipped with a fabric controller, which is generally responsible for various duties surrounding the maintenance and management of the health of computer resources that support the underlying functionality of the cloud.

For example, the fabric controller may be responsible for orchestrating updates to the stateful service applications running on the cloud by targeting and reconfiguring the nodes on which portions of the stateful service applications reside. During these updates, the fabric controller considers the availability of the service-application portions when targeting the nodes to ensure no stateful service application is rendered inoperable. Further, the fabric controller determines which nodes to target by considering an internal state of the service-application portions, thus, attempting to ensure no internal state is taken entirely offline during an update.

In an exemplary embodiment, the fabric controller relies upon a software component (referred to herein as the "tenant-change manager") for orchestrating the update in order to schedule the reconfiguration of nodes in such way that the stateful service applications remain online and fully functional. In operation, the tenant-change manager employs a protocol that interacts between the fabric controller and specialized components of the stateful service applications. These specialized components (referred to herein as "management roles") are implemented within the stateful service application to monitor the internal states of the functional portions of the stateful service applications, such as instances of roles of the stateful service application.

This interaction facilitated by the tenant-change manager guarantees proper sequencing of change operations within stateful service applications by considering the availability of the internal state of the role instances in order to maintain constant high availability of the entire stateful service application. By way of example, this consideration of the internal state-availability involves the management roles inferring the internal states during change operations and reporting this information to the tenant-change manager. The tenant-change manager employs this information for establishing a start-time for implementing change operations, or "tenant jobs," on certain role instances of the stateful service application. Thus, the interaction between the tenant-change manager and the management role assesses a true availability of the stateful service application by taking into account the individual internal states of the distributed role instances.

BRIEF DESCRIPTION OF THE DRAWINGS

Embodiments of the present invention are described in detail below with reference to the attached drawing figures, wherein:

FIG. 8 is a flow diagram showing an overall method for scheduling a high-priority job when executing a tenant job, in accordance with an embodiment of the present invention.

DETAILED DESCRIPTION

Figure 1:
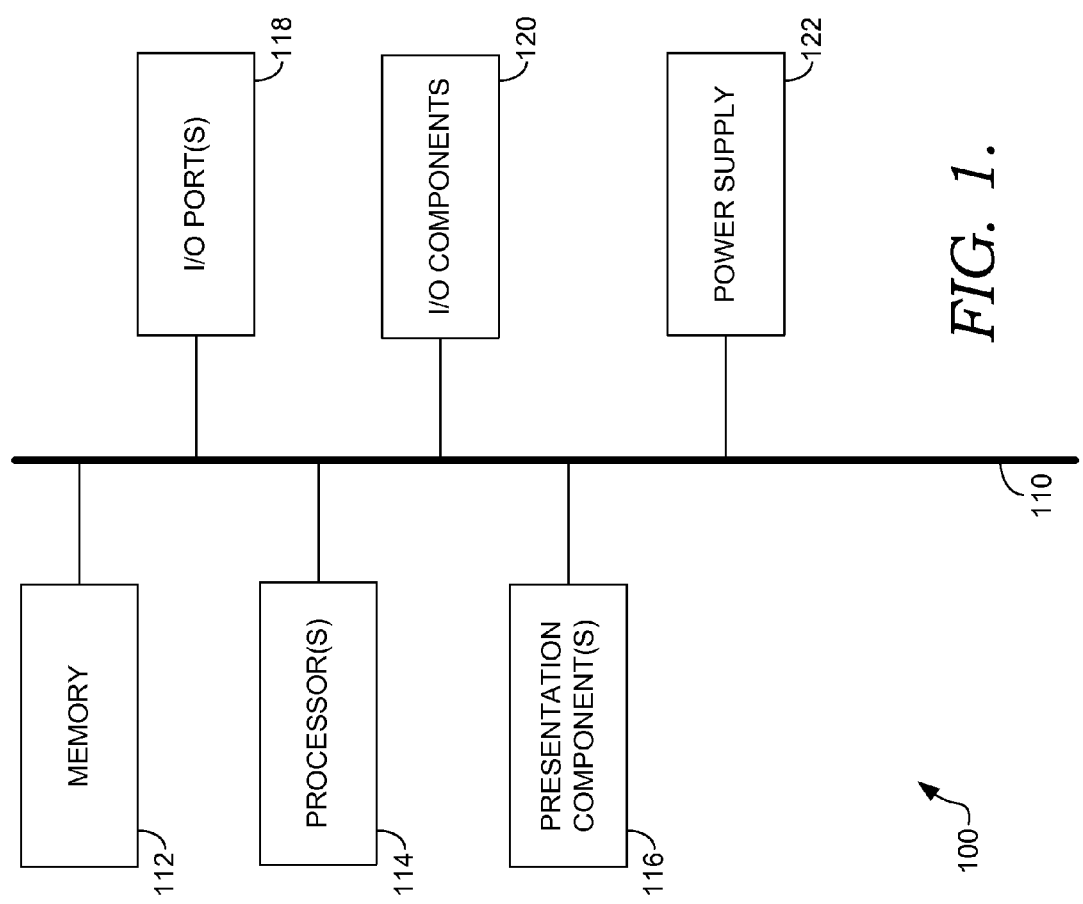
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally, embodiments of this invention introduce mechanisms within a cloud-computing network to support the update and repair of stateful service applications by allowing these stateful service applications to maintain high availability to their customers. In particular, these mechanisms are capable of managing the ongoing availability of these stateful service applications during upgrades, configuration changes, scaling up or down, and relocation procedures for the portions of the stateful service application (referred to herein as "role instances"). In an exemplary embodiment, these mechanisms rely upon an interaction between the stateful service applications and the fabric controller, which manages the lifecycle of the roles instances of the stateful service application. As discussed in detail below, in one instance, the mechanism is comprised of a tenant-change manager residing at the fabric controller and management role(s) residing within the stateful service application that interact to intelligently schedule the updates or repairs.

As used herein, the phrase "stateful service applications" generally refers to those service applications in which a state is embedded into their respective role instances, or program components. For instance, within a financial institution's service application that is tasked with exposing a particular online interface for conducting banking, a state may contain customer data (e.g., account information), which is maintained inside the role instances of the service application. That is, the customer data is hosted locally at the service-application role instances, as opposed to being uploaded to a remote location. Accordingly, when the service application is distributed across various nodes within a cloud-computing network, the customer-provided account information, or "state," is also distributed across the nodes of the cloud-computing network. Further, because there are multiple customers that conduct banking with the service application, each role instance may have a slightly different internal state.

Thus, along with knowing the availability and health of the platform underlying the cloud-computing network, understanding the internal states of the distributed service applications running therein are helpful to schedule a timing of maintenance and recovery operations. For instance, when performing maintenance and recovery operations, portions of the service application may be taken offline. Taking these portions offline could adversely impact or even disable the entire service application if no copies of a particular internal state remain online. Accordingly, embodiments of the present invention involve a mechanism for understanding the locations of various internal states and coordinating the maintenance and recovery operations such that a copy of each internal state remains online.

As a result, the coordination of the maintenance and recovery operations with an understanding of the internal-state locations helps achieve a high reliability of the internal states of the role instances. In one embodiment, coordination may involve replicating a particular state across a plurality of instances of the same role in order to allow one of the role instances that locally host the particular state to be taken offline. For example, if a role presently has five instances distributed throughout a data center, and if a particular one of the role instances stores a state that the customer desires to persist, that stored state is copied, propagated, and maintained at other(s) of the five instances prior to the particular role instance being taken offline. In this way, replication of the stored state across various role instances on various nodes ensures reliability of the particular state. Thus, even if the particular role instance fails outside the scope of the maintenance and recovery operations, another role instance persists the stored state of the failed role instance.

Although various different embodiments for replicating states in view of maintenance and recovery operations have been described, it should be understood and appreciated that other types of suitable service applications may be updated via the processes described herein, and that embodiments of the present invention are not limited to those stateful service applications described herein. For instance, stateless service applications may be addressed in a similar fashion when executing a tenant job within the underlying platform of the cloud-computing network. As used herein, the phrase "stateless service application" generally refers to a service hosted by the cloud-computing network that offloads its storage data to an external entity, such as another data center that is capable of managing the storage data. This data center may hold different states on different physical machines but is capable of managing the states by creating many redundancies (e.g., multiple copies across multiple machines).

Accordingly, in one aspect, embodiments of the present invention relate to one or more computer-readable media that have computer-executable instructions embodied thereon that, when executed, perform a method for facilitating interaction between a fabric controller of a cloud-computing network and a service application running in the cloud-computing network. The method may initially involve selecting a first update domain (UD) that includes one or more role instances of the service application. Typically, the role instances are operating in an online condition and represent respective component programs (e.g., a single replication of a role of the service application) that support the functionality of the service application.

The method may further involve preparing the first UD for execution of a tenant job (e.g., platform-initiated update, a customer-initiated update, a platform-initiated repair, or a customer-initiated repair). In an exemplary embodiment, preparing the first UD includes at least the following steps: notifying a management role within the service application of the fabric controller's intent to execute the tenant job; and receiving a response from the management role upon determining whether an internal state of the role instance(s) affected by the tenant job is replicated on a portion of the service application that is unaffected by the tenant job. In embodiments, the response is generated by the management role upon inspecting the role-instance(s) internal state and/or upon taking other actions. These other actions may involve, for example, retrieving additional information (e.g., status of the roles of the tenant) using channels built within an infrastructure of the cloud-computing network. Upon preparing the role instance(s) of the first UD, disablement of these role instance(s) to an offline condition is initiated. Generally, disabling the role instance(s) involves rendering inoperative a set of nodes that host the one or more role instances within the first UD. The tenant job is allowed to execute on the first UD once the role instance(s) have assumed the offline condition.

Further yet, the method may involve restoring the role instance(s) of the first UD to the online condition upon completing execution of the tenant job. In an exemplary embodiment, restoring the instance(s) of the first UD to the online condition includes at least the following steps: verifying the role instance(s) affected by the tenant job are functional; and notifying the management role that execution of the tenant job on the role instance(s) is complete, thus, prompting the service application to resume employing the role instance(s) for carrying out tasks. Generally, restoring the role instance(s) within the first UD to the online condition also involves rendering operative the set of nodes that host the role instance(s). Upon restoring the role instance(s) within the first UD to the online condition, the method may continue by selecting a second UD of role instances for running the tenant job thereon. Typically, the first UD and the second UD are mutually exclusive in membership and each may represent a discrete phase in propagating the tenant job throughout the cloud-computing network.

In another aspect, embodiments of the present invention relate to a computerized method for scheduling a high-priority job when executing a tenant job. The computerized method involves the carrying out the logical steps of receiving an indication to execute the tenant job on a service application and identifying an update domain (UD) that includes one or more role instances of the service application. At this point, the role instance(s) are operating in an online condition. The UD is prepared for execution of the tenant job and, subsequently, the instance(s) of the UD are disabled to an offline condition. In an exemplary embodiment, the process of preparing the UD for execution of the tenant job involves various logical steps including the following: notifying a management role within the service application of an intent to execute the tenant job; and either receiving a positive response from the management role or receiving a negative response from the management role.

Typically, the positive response is received upon the management role determining the internal state of the role instance(s) affected by the tenant job is replicated on a portion of the service application that is unaffected by the tenant job. Upon a tenant-change manager (operating within a fabric controller) receiving the positive response from the management role, the tenant job is likely allowed to execute on the role instance(s). Alternatively, the negative response is received upon the management role determining that the internal state of the role instance(s) affected by the tenant job is confined to those role instance(s). Upon the tenant-change manager receiving the negative response from the management role, a number of operations may ensue. In one embodiment, when the indication to execute the tenant job is customer-initiated, execution of the tenant job on the role instance(s) is delayed in order to allow for replication of the internal state. In another embodiment, when the indication to execute the tenant job is platform-initiated, execution of the tenant job on the role instance(s) is prompted to proceed.

At some later point, an indication to implement a high-priority job is received. As used herein, the phrase "high-priority" is not meant to be limiting, but may represent any job that is predetermined to preempt the tenant job within a priority scheme. Upon receipt of the indication to implement the high-priority job, deployment of the tenant job is yielded to the high-priority job. In an exemplary embodiment, the process of yielding involves various logical steps including the following: instructing the service application to perform a truncated set of operations that restore the role instance(s) to the online condition; placing the tenant job on hold; and initiating execution of the high-priority job on the role instance(s).

Upon completing execution of the high-priority job, deployment of the tenant job is resumed. In an exemplary embodiment, the process of resuming involves various logical steps including the following: reinitiating disablement of the role instance(s) of the UD to the offline condition; and allowing execution of the tenant job on the role instance(s). Once the execution of the tenant job is completed, the role instance(s) of the UD may be restored to the online condition. In an exemplary embodiment, the process of restoring the role instance(s) to the online condition involves various logical steps including the following: verifying the role instance(s) affected by the tenant job are functional; and notifying the management role that execution of the tenant job on the role instance(s) is complete, thus, prompting the service application to resume employing the role instance(s) to carry out various tasks.

In yet another aspect, embodiments of the present invention relate to a computer system for performing a method that coordinates the deployment of a tenant job to component programs of a service application. Generally, the computer system includes a processing unit coupled to a computer storage medium, where the computer storage medium stores a plurality of computer software components executable by the processing unit. Initially, the computer software components include one or more role instances of the service application, a tenant-change manager, a management role, a host agent, a wire protocol, a scheduling component, and a node-state driver. In embodiments, the role instances represent component programs that support the functionality of the service application. The tenant-change manager is typically configured for directing deployment of the tenant job. The process of directing deployment generally involves communicating an indication of the deployment of the tenant job, initiating disablement of the role instance(s) to an offline condition, allowing for execution of the tenant job on the role instance(s), and initiating restoration of the role instance(s) to the online condition.

The management role, which is a component of the service application, is typically configured for monitoring an internal state of the role instance(s). In embodiments, upon receiving the indication of the deployment of the tenant job, the management role is responsible for determining whether the monitored internal state of the role instance(s) affected by the tenant job is replicated on a portion of the service application that is unaffected by the tenant job. Also, the management role may be configured for communicating an indication of availability of the internal state to the tenant-change manager.

The host agent typically resides on a node that hosts the role instance(s). In operation, the host agent reveals an expected state of the role instance(s) to the service application through the wire protocol. As used herein, the phrase "expected state" generally represents a goal for the role instances to assume an offline condition or online condition. The scheduling component is generally configured for causing the tenant job to be interrupted by a high-priority job in accordance with a priority scheme. And, the node-state driver is generally configured for disabling the role instance(s) to the offline condition, executing the tenant job, and restoring the role instance(s) to the online condition under the direction of the tenant-change manager.

As mentioned above, tenant jobs are often partitioned into phases and carried out incrementally across groups of role instances of a service application, as opposed to taking offline all the role instances of the service application concurrently.

Thus, embodiments of the present invention relate to identifying update domains within a hosting environment, or data center. As utilized herein, the phrase "update domain" is not meant to be limiting and generally refers to a description of a set of nodes (e.g., physical machines or virtual machines) that host one or more role instances of the service application and that may be taken offline simultaneously. In a particular embodiment, the set of nodes described by the update domain represents nodes that may become simultaneously unavailable (e.g., upon intentionally inducing those nodes to fall offline in order to install software thereto) while ensuring the service applications that rely on those nodes remain available. That is, the set of nodes of the update domain typically comprises a limited number of nodes that are allowed to be concurrently nonfunctional, when executing a tenant job, in order to ensure the role instances that run on the set of nodes have replications outside the update domain. Thus, update domains are set in place to assure an owner of a service application that only a minimal number of role instances of the service application will simultaneously fail.

Establishing update domains generally involves abiding by various rules imposed by the hosting environment. For instance, there may exist restrictions on a number of instances of role A, for example, that may be joined to a common update domain. Or, there may exist restrictions on a number of instances of role B that may be joined to a common update domain with instances of role A. Generally, as used herein, "roles" provide a template description of a functional portion of the service application. For instance, in the case of an online-shopping service application, there may be three core tasks that are divided among three roles, respectively: role A (assigned the task of presenting a first GUI to receive a purchase order), role B (assigned the task of carrying out the purchase order), and role C (assigned the task of presenting a second GUI to communicate a status of the purchase order). In an exemplary embodiment, roles each represent a particular class of program component of the service application. Typically, a service model delineates how many instances of each of the roles to place within the data center, where each of the instances is a replication of the particular class of program component, or role. In other words, each role represents a collection of instances of each class of program components, where the service application may have any number of classes of program components for carrying out functions thereof.

Roles often have configuration settings applied thereto. In one instance, the role's configuration settings may include collective settings which are shared by all instances of the role. In another instance, the configuration settings may include individual settings that are particular to each instance of a role. These individual settings may include a state that is stored at instance of a role, where the state is specific to that role instance. With reference to the online-shopping service application mentioned above, a state stored at an instance of role B may be details of a particular purchase order made by a certain client.

Having briefly described an overview of embodiments of the present invention, an exemplary operating environment suitable for implementing embodiments of the present invention is described below.

Operating Environment

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Architecture of a Data Center

Figure 2:
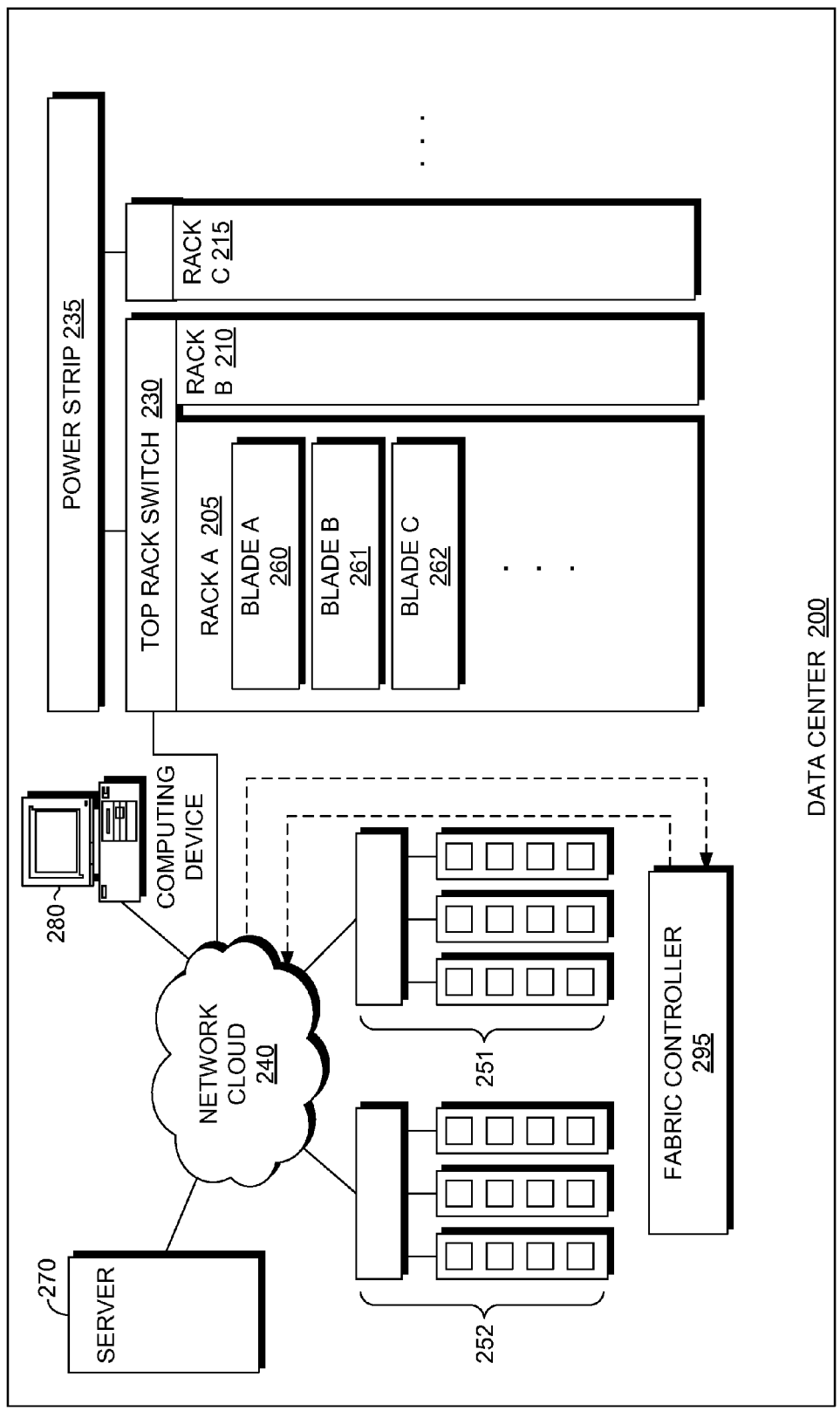
FIG. 2 is a block diagram illustrating a data center, suitable for use in implementing embodiments of the present invention, that is configured to accommodate and support operation of a service application that is distributed across nodes of the data center.

Turning now to FIG. 2, a block diagram is illustrated, in accordance with an embodiment of the present invention, showing a data center 200 configured to accommodate and support operation of component programs, or instances of roles, of a service application according to a service model. It will be understood and appreciated by those of ordinary skill in the art that the data center 200 shown in FIG. 2 is merely an example of one suitable portion of a hosting environment and is not intended to suggest any limitation as to the scope of use or functionality of embodiments of the present invention. Neither should the data center 200 be interpreted as having any dependency or requirement related to any single resource or combination of resources illustrated therein. Further, although the various blocks of FIG. 2 are shown with lines for the sake of clarity, in reality, delineating various components is not so clear, and metaphorically, the lines would more accurately be grey and fuzzy.

The data center 200 includes various resources interconnected via a network cloud 240. These resources, as described herein, may include software components (e.g., fabric controller 295) as well as tangible hardware elements, such as rack A 205, rack B 210, rack C 215, top rack switch 230, power strip 235, server 270, computing device 280, update domain 251, and update domain 252. The network cloud 240 interconnects these resources such that instances of service applications, which may be distributably placed across various physical resources, may recognize a location of other instances in order to establish communication therebetween. In addition, the network cloud 240 facilitates this communication over channels connecting the instances of the service application, and any other elements required by the service model. The network may include, without limitation, one or more local area networks (LANs) and/or wide area networks (WANs). Such networking environments are commonplace in offices, enterprise-wide computer networks, intranets, and the Internet. Accordingly, the network is not further described herein.

Generally, the data center 200 accommodates a distributed system with a plurality of component programs, or role instances of the service application, running independently on processing equipment that executes the component programs, but interconnected via the network cloud 240. Occasionally, these computational resources, or nodes, can be subject to various updates. The update domains 251 and 252 typically provide some set of guarantees that the role instances of the service application will be distributed across resources in the data center 200 and will not all concurrently fall offline during an update of the underlying platform. Accordingly, consistency in operation of the service application is preserved.

Returning to the configuration of the data center 200, each of the server 270, the computing device 280, the fault domains 251 and 252, and the racks A 205, B 210, and C 215 that have blades (e.g., blades A 260, blade B 261, blade C 262) operably coupled thereto can be any type of computing device, such as, for example, computing device 100 described above with reference to FIG. 1. By way of example only, and not limitation, each of server 270, the computing device 280, and the blades A 260, blade B 261, and blade C 262 can be a personal computer, a desktop computer, a laptop computer, a handheld device, a mobile handset, consumer electronic device, and the like. In embodiments, data center 200 may include any number of the physical resources listed above, and may include any collection of computing devices, or other machines capable of executing the service application.

Additionally, one or more of the physical resources above can further host the fabric controller 295 residing thereon to deploy, access, and manage the service application via wired or wireless network paths through the data center 200. It should be noted, however, that embodiments of the present invention are not limited to implementation on such physical resources illustrated in FIG. 2 but may be implemented on any of a variety of different types of computing devices and equipment within the scope of embodiments hereof. In other words, illustrated resources of the data center 200 depict an exemplary configuration that is intended for discussion purposes only; accordingly, any suitable layout of resources known in the computing industry may be used and is contemplated by the present invention.

In particular, the exemplary resources of the data center 200 serve to introduce the concept of update domains. As discussed above, update domains represent a collection, or set, of nodes that become unavailable upon the execution of a tenant job within the data center 200. As discussed above, a node may reference a blade (e.g., blades A 260, blade B 261, and blade C 262), computer (e.g., computing device 280), machine (e.g., server 270), or any other device capable of running component programs, or instances, of the service application in the data center 200. Accordingly, the advantage of abstracting update domains is to understand which groups of resources within the data center fall offline together upon executing one phase of the tenant job, and how other resources are partitioned from falling offline.

Although various different configurations of the data center 200 and the update domains 251 and 252 have been described, it should be understood and appreciated by those of ordinary skill in the art that other types of suitable update domains that group a set of nodes, based on an identity of the roles instances running thereon, may be abstracted, and that embodiments of the present invention are not limited to those update domains 251 and 252 illustrated herein.

Update Domains of the Service Application

Figure 3:
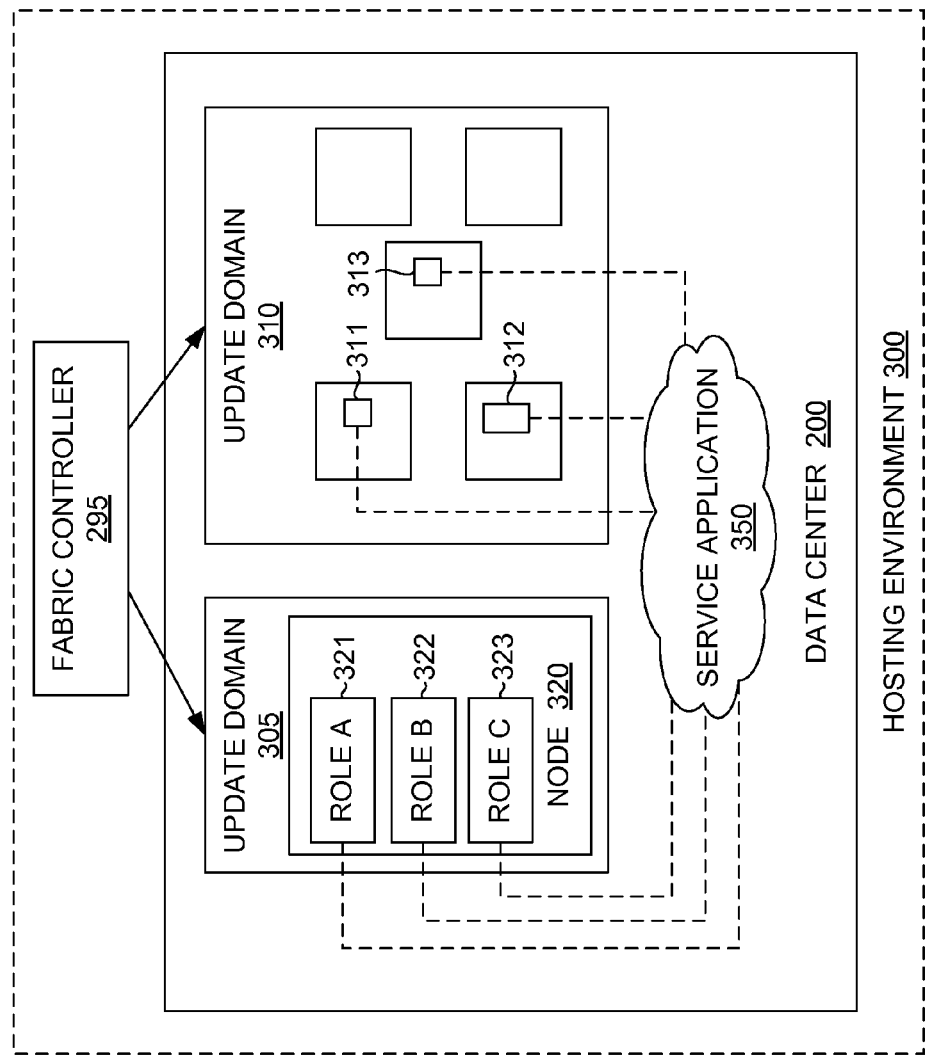
FIG. 3 is a block diagram illustrating an exemplary hosting environment with instances of roles grouped to form update domains for incrementally implementing a tenant job within the data center, in accordance with an embodiment of the present invention.

Turning now to FIG. 3, a graphical representation of an exemplary hosting environment 300 is shown, in accordance with an embodiment of the present invention. In particular, the hosting environment 300 includes the fabric controller 295, a service application 350, and the data center 200 for supporting the operation of the fabric controller 295 and the service application 350. As discussed above, the data center 200 includes resources that are organized into update domains 305 and 310 based, in part, on a redundancy of roles A, B, and C of the service application 350, where the roles are located at instances 311, 312, 313, 321, 322, and 323. Generally, the update domains 305 and 310 each describe one or more nodes that are intentionally induced to become concurrently unavailable in accordance with an update scheme, or "job list." In embodiments, the job list (see reference numeral 610 of FIG. 6) organizes the scheduled and/or pending tenant jobs according to priority. As more fully discussed below, at least a portion of the job list is exposed to a management role of the service application 350 in order to prepare the service application 350 to receive the upcoming tenant job.

As used herein, the phrase "tenant job" refers to an immutable set of change operations that are performed against the service application 350 by the fabric controller 295. These change operations can impact the availability of the service application 350. In embodiments, there are presently a fixed number of tenant-job types defined by the hosting environment 300. However, these job types may be extended in the future. Exemplary tenant jobs that are focused on the service application 350 include the following: service-application update job (e.g., maintenance action); and service-application code revisions (e.g., upgrade action or roll out a new version); service-application topology changes; service-application configuration changes; service-application guest OS changes within a virtual machine (VM) of the node 320 that employs a reboot (e.g., stop-and-start operation); service-application repairs that employ a reboot and a repave (e.g., change registry of the guest OS). Generally, repairs are initiated when the VM cannot be restored by other processes.

Other types of tenant jobs may be focused on maintenance of the hosting environment 300. Examples of these tenant-job types include the following: infrastructure updates (taking the instances 321, 322, and 323 offline when malfunctioning); migrating the application 350 from one geo-location to another geo-location (e.g., relocation of the instances 321, 322, or 323 due to hardware and other platform problems); and resource updates (e.g., update to an agent that monitors the instances 321, 322, and 323 running on a VM of the node 320). Although focused on changing the hosting environment 300, these types of tenant jobs also may create an interruption of availability of the instances 321, 322, or 323.

The execution of tenant jobs may be driven by requirements of the hosting environment 300 (e.g., updating a version of the operating system software) or may be induced by the curator thereof. When a tenant job is selected for implementation within the data center 200, the actual execution of the tenant job may be carried out incrementally in phases. That is, tenant jobs are divided into phases, where the execution of each of the phases potentially affects a portion (e.g., one or more role instances) of the service application 350. For example, if the service application 350 has ten instances of role A, the tenant job may be broken into ten phases, which may be broken down further into subsets. In embodiments, either an entire update domain or a subset of the update domain may be affected by a phase, depending on the tenant-job type, constraints specific to the tenant job, or the deployment layout of the service application 350. Further, ordering of the phases for execution may be specific to the tenant-job type and/or governed by a service model of the service application 350.

In operation, carrying out each phase may involve executing the tenant job at a different update domain until each of the update domains is addressed. For instance, a first phase of the tenant job may involve disabling the node 320 within the update domain 305 for carrying out a maintenance operation, while a second phase of the tenant job may involve disabling the nodes within the update domain 310. Disabling the node 320 implicitly and concurrently pulls the roles 321, 322, and 323 offline. However, because role A is located at instances 311 and 321, role B is located at instances 322 and 312, and role C is located at instances 323 and 313, pulling the roles 321, 322, and 323 offline will not necessarily render the service application 350 unavailable.

Occasionally, when a role is located at only a minimal number of instances, just a subset of an update domain is actually taken down during a phase of the tenant. That is, any combination of the role instances 321, 322, and 323 may be simultaneously taken down when they are grouped into the same update domain 305. Yet, the affects of the tenant job are limited to just those role instances 321, 322, and 323 of the update domain 305 during the first phase.

If the service application 350 is a stateful application, and if the states the role instances 321, 322, and 323 (included in update domain 305) are not replicated at role instances 311, 312, and 313 (included in update domain 310), then unavailability of information may occur when implementing the first phase of the tenant job. Accordingly, embodiments of the present invention discussed below involve technology for coordinating a tenant job such that states stored at role instances are not made unavailable when iteratively carrying out the phases of the tenant job.

Embodiments of the present invention further involve an update to the topology of a distributed service application 350. Advantageously, the topology update allows the role instances of the service application 350 to inspect the other role instances of the service application 350 for the purpose of intercommunication. In instances, the topology update involves a mechanism for propagating information regarding the service-application topology throughout the role instances thereof. By way of example, this propagated information may include a description of changed addresses of relocated role instances and/or other data that may be dispersed to the entire service application 350.

The topology update will now be described with reference to FIG. 3. Initially, if the instance 321 of role A desires to communicate with the instance 322 of role B, the instance 321 should know the location of the instance 322 (e.g., IP address) in order to initiate the communication. Typically, a mapping of IP addresses against names of the role instances 321 and 322, respectively, is used in order to foster the communication therebetween. This mapping is maintained at each of the instances 321 and 322.

Upon initial deployment of the instances 321 and 322, the mapping is current, as the locations of the instances 321 and 322 have remained static since instantiation on the node 320. Over time, upon updates dynamically occurring to the service application 350 (e.g., relocated, added, or removed), one or both of the instances 321 and 322 may experience a change to the original IP address. These changed IP addresses of one or more of the instances 321 and 322 may leave the other instances of the service application with inaccurate mappings, thus, resulting in an inconsistent view of the service-application topology and a disruption in intercommunication. For example, if the mapping maintained at the instance 321 includes inaccurate information regarding the service-application topology because the instance 322 has moved, the instance 321 may be unable to locate or talk with the instance 322.

To solve this issue discussed above, the topology update is configured to impose redundancy measures that memorialize the changes of IP addresses with respect to the update domains. For instance, when two role instances 321 and 311 are added to two separate update domains 305 and 310, respectively, the service application 350 operating within a first update domain 305 is notified that the first role instance 321 is being placed therein, while the service application 350 operating within a second update domain 310 is notified that the second role instance 311 is being placed therein. Then, upon distributing the notifications, the first and second role instances 321 and 311 are instantiated and started in their respective update domains 305 and 310. Thus, the topology information residing at the mapping of the other role instances 322, 323, 312, and 313 is updated twice, giving the service application 350 a consistent view of where new role instances 321 and 311 are located.

Applying the Tenant Job to the Update Domains (UDs)

Figure 4:
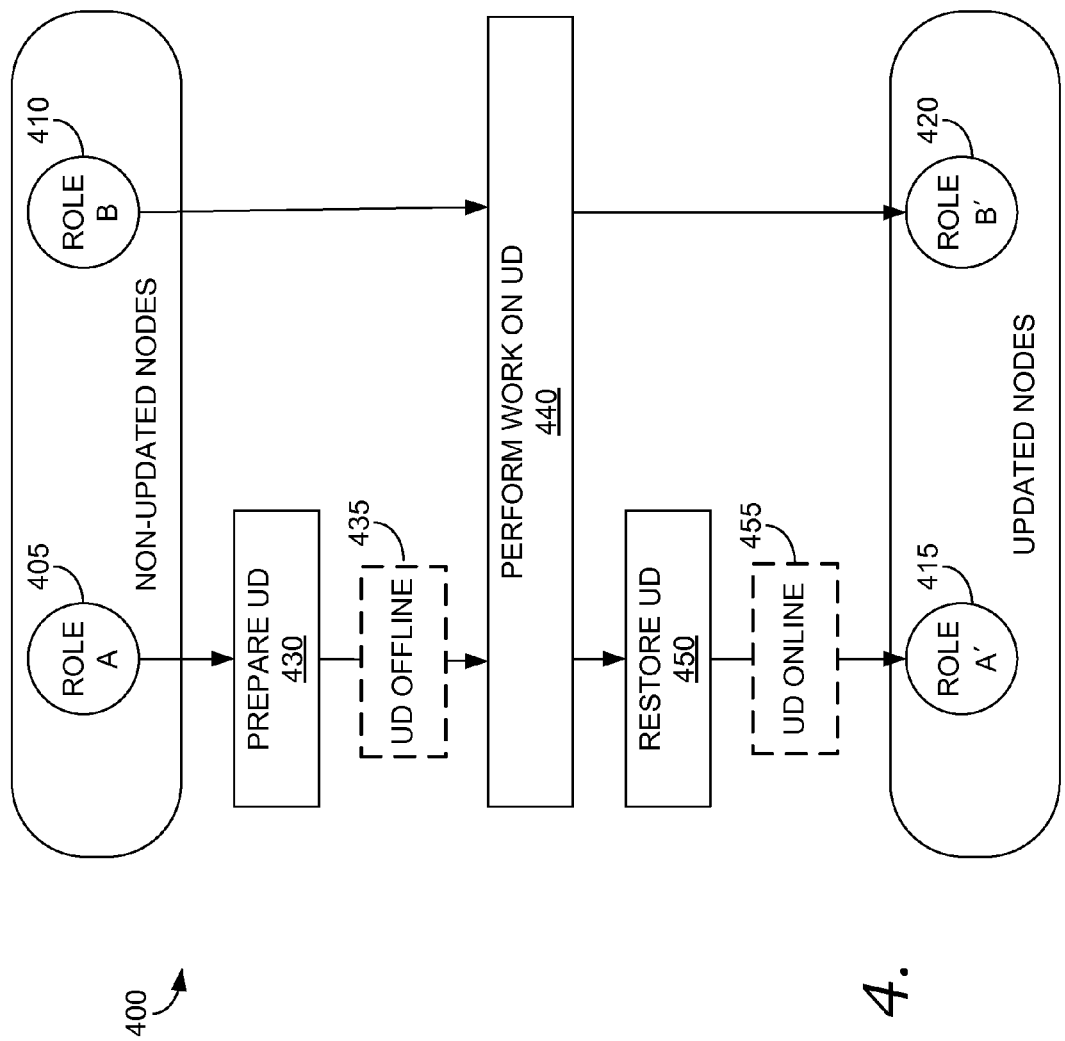
FIG. 4 is a graphical representation of process flows for both a stateful node and a stateless node, in accordance with an embodiment of the present invention.

Turning now to FIG. 4, a graphical representation is shown illustrating process flows for executing a phase of a tenant job on both a stateful service application (e.g., role A) and a stateless service application (e.g., role B), in accordance with an embodiment of the present invention. When executing the tenant job on the stateless service application, there is typically no consideration of an internal state stored specifically on one or more of the role instances. Accordingly, the role instances of the stateless application may be taken offline as scheduled. For example, when a phase of the tenant job involves updating a UD that encompasses role instance B 410 of the stateless application, the tenant job is executed on the role instance B 410 (see block 440 of FIG. 4) resulting in updated role instance B' 420. In this example, there is no reason to coordinate with other role instances of the stateless application because the states are safely uploaded to a remote data store (i.e., not locally stored at the role instance B 410).

However, when executing the tenant job on a stateful service application, there is consideration of the internal state stored on the role instances. Accordingly, the role instances of the stateful service application may be taken offline in a coordinated manner. In an exemplary embodiment, this coordination involves employing at least the following stages when executing the tenant job at the UD: preparing the UD (see block 430); performing work on the UD (see block 440); and restoring the UD (see block 450). When preparing role instance A 405 of the UD for receiving the tenant job, a management component (see reference numerals 597, 598, and 599 of FIG. 5) of the stateful service application is responsible for determining whether the role instance A 405 may be taken offline and identifies the internal state(s) stored on the role instance A 405.

In embodiments, determining whether the role instance A 405 may be taken offline involves at least the following steps: recognizing an intention of a fabric controller to execute a particular tenant job (e.g., receiving from the fabric controller a goal state of the role instance A 405 that alerts the management role that the role instance A 405 will be taken to an offline condition); receiving information from the fabric controller that describes the tenant-job type (e.g., operations to be performed and effects of those operations on the role instance A 405); causing the fabric controller to pause execution of the tenant job (e.g., until the management role responds with approval to move forward or until the expiration of a predetermined time period); taking actions to ascertain whether the service application will remain available upon taking the role instance A 405 to an offline condition; and responding to the fabric controller with a message. Thus, the management role prompts the service application to reconfigure itself to no longer rely or count on the role instance A 405 within the UD being taken to the offline condition. In this way, the message sent from the management role in response to the fabric controller may indicate that the role instance A 405 is ready to be taken offline.

If, upon assessing the tenant-job type scheduled to be executed on the role instance A 405 and ascertaining that the service application will not remain available upon taking the role instance A 405 to the offline condition, the management role may disagree with the taking down of the UD. In this way, the management role may respond to the fabric controller with a message that rejects allowing the tenant job to continue on the role instance A 405. Upon considering the message from the management role that conveys a rejection of the tenant job, the fabric controller intelligently decides how to proceed based, in part, on the tenant-job type. For example, if the tenant-job type involves a repair to the underlying platform of the hosting environment, the fabric controller may proceed with execution of the tenant job on the role instance A 405 despite the management role's attempted rejection. If the tenant-job type involves an update to just the service application, the fabric controller may heed the rejection of the management role and cancel execution of the tenant job on the role instance A 405. If the tenant-job type involves a maintenance action to the OS of a node hosting the role instance A 405, the fabric controller may attempt to coordinate taking the role instance A 405 to the offline condition with the management role. In one instance, coordination includes the management role requesting a pause that temporarily interrupts the execution of the tenant job in order to allow the role instance A 405 to replicate its internal state to another role instance outside the UD currently targeted for the tenant job. In another instance, coordination includes mediating failover by controllably delaying taking the role instance A 405 to the offline condition and by replicating its internal state in order to generate redundancies across the UDs while, at the same time, taking other role instances of the UD to the offline condition.

When the management role and/or the fabric controller determines that the role instance A 405 may be taken to an offline condition (see block 435), work may then commence on the UD that encompasses the role instance A 405 (see block 440). Within the work stage, the fabric controller performs various tasks according to a definition of the tenant job (e.g., carrying out a maintenance action). Typically, during the work stage, the fabric controller carries out the execution of the tenant job without conversation with the management role. Once the tasks of the tenant job are accomplished, the role instance A 405 is allowed to stabilize, such that the internal state(s) are not transient, prior to moving on to the next stage.

Upon the role instance A 405 stabilizing, the UD may be restored (see block 450). During the restoration stage, the management role of the service application is notified by the fabric controller that the tenant job is completed. Further, during the restoration stage, the management role is responsible for ensuring that all the impacted role instances are functional and stable before taking the UD to an online condition (see block 455) and designating the role instance A 405 as updated role instance A' 415. As can be seen, there exists coordination between the management role of the service application and the fabric controller during the UD preparation stage 430 and the UD restoration stage 450. In particular, during these two stages 430 and 450 the management role computes the availability of the service application to determine whether the tenant job can proceed to the next stage. Depending on the job type and the service application account settings, the application may or may not block the job execution, but in any case it can delay the job execution.

Occasionally, a high-priority job may be issued while the tenant job is pending (e.g., role A 405 is processing at one of the stages 430, 440, or 450). When the high-priority job is detected as being issued, the pending tenant job is preempted. In an exemplary embodiment, preemption may involve yielding execution of the tenant job, allowing the high-priority job to execute on the role A 405, and resuming the tenant job upon completing execution of the high-priority job.

During preemption, for instance, a scheduling component (see reference numeral 530 of FIG. 5) may send a yield request to a node-state driver (see reference numeral 460 of FIG. 5), which is responsible for advancing the stages 430, 440, and 450 at the role A 405. This yield request momentarily suspends the pending tenant job causing the tenant job to stop progress, while invoking the high-priority job to commence on the role A 405. In other words, the scheduling component instructs the node-state driver to perform the appropriate operations that transition the tenant job from an active state to a passive state and that transition the high-priority job from a passive state to an active state, as typically just one job is executed at a time on the role A 405. These appropriate operations may involve forcibly bringing the role A 405 to an online condition, such that role A 405 is substantially restored, and taking the role A 405 to an offline condition, such that the high-priority job may perform work on the role A 405.

Upon completion of the high-priority job, while the tenant job is waiting to resume, a determination may be made by the scheduler whether to reconvene the interrupted tenant job. By way of example, a status of the role A 405 (e.g., current version of software running on role A) may be measured and, based on the status, the tenant job may either reconvene at the role A 405 or be canceled. Thus, the process of preempting a pending tenant job may involve various determinations and actions that can alter (e.g., add, remove, modify) stages 430, 440, and 450 within the typical progression of the tenant job.

Components for Implementing the Tenant Job

Figure 5:
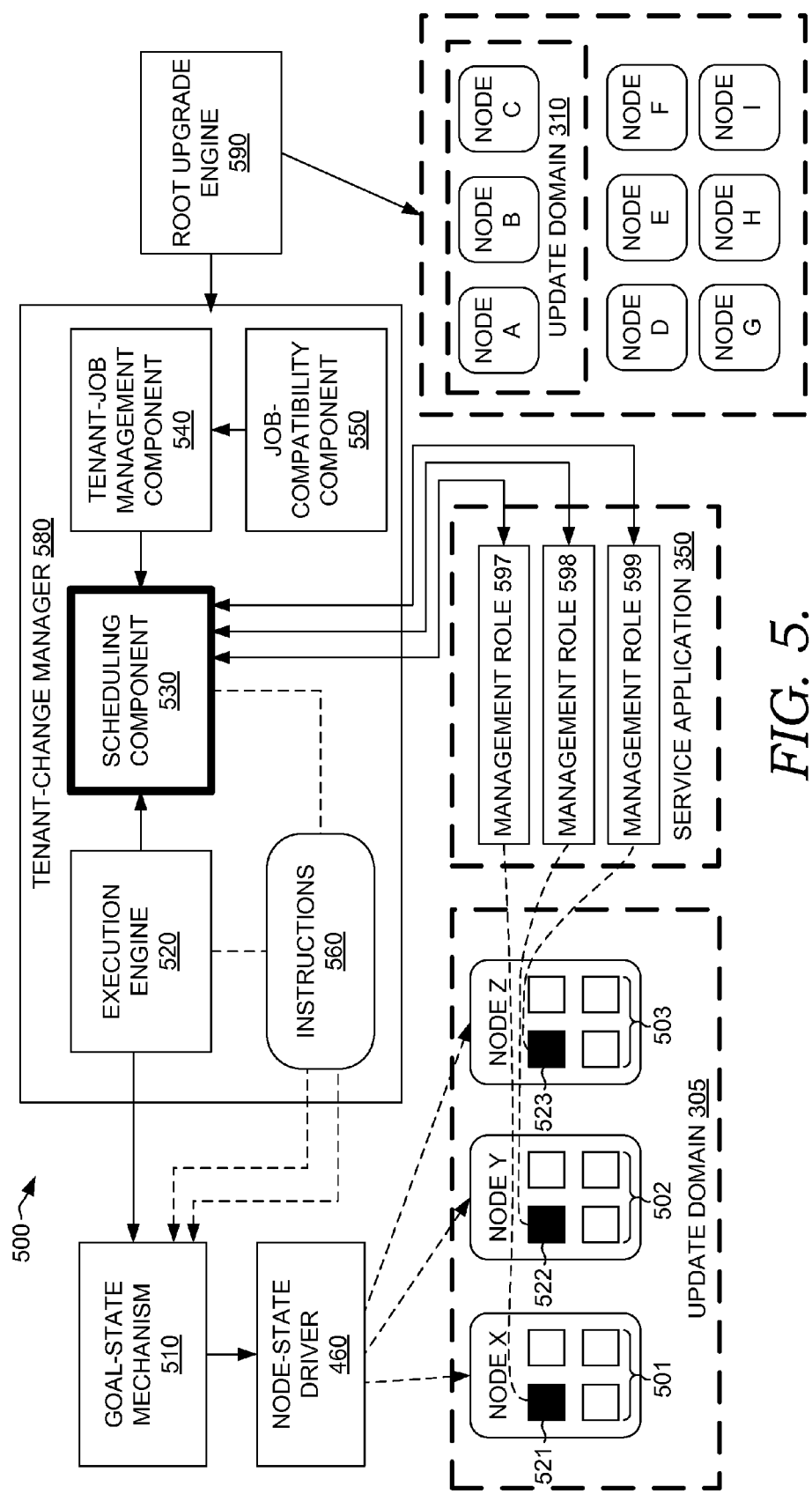
FIG. 5 is a block diagram illustrating a cloud-computing network that includes various components for carrying out discrete operations of implementing a tenant job, in accordance with an embodiment of the present invention.

With reference to FIG. 5, a block diagram is illustrated that shows a cloud-computing network 500 that includes various components for carrying out discrete operations of implementing the tenant job, in accordance with an embodiment of the present invention. Generally, the network 500 depicts one example of an interaction between a tenant-change manager 580 and management roles 597-599 of the service application 350. This interaction may influence coordinating the implementation of a tenant job across the network 500 and/or across the service application 350.

Initially, the tenant-change manager 580 represents a component of the fabric controller 295 of FIG. 3 that is responsible for interacting with the management roles 597-599 of the service application 350 and directing deployment of a tenant job based, in part, on those interactions. The process of directing deployment generally involves communicating an indication of the deployment of the tenant job to the management roles 597-599, initiating disablement of role instances 521-523 to an offline condition, allowing for execution of the tenant job on the role instance 521-523, and initiating restoration of the role instances 521-523 to the online condition. The management roles 597-599, which are components of the service application 350, are typically configured for monitoring internal states of the role instances 521-523, respectively, which are grouped within an update domain 305. In embodiments, upon receiving the indication of deployment of the tenant job, the management roles 597-599 are responsible for determining whether the monitored internal states of the role instances 521-523, respectively, are replicated on a portion of the service application 350 that is unaffected by the tenant job, such as on nodes A, B, and C of update domain 310. As depicted herein, the tenant job is initially targeting the update domain 305, which affects availability of the components 501, 502, and 503, being hosted on the nodes X, Y, and Z, respectively. Also, the management roles 597-599 may be configured for communicating an indication of availability of the internal state to the tenant-change manager 580.

The tenant-change manager 580 will now be described in detail with respect to FIG. 5. As mentioned above, the tenant-change manager 580 is generally charged with controlling an update and/or repair to an underlying platform of the cloud-computing network 500 (e.g., scheduling and orchestrating the tenant job). The process of controlling may involve the tenant-change manager 580 managing interaction between the management role 597-599 and the goal-state mechanism 510. Typically, each tenant job is associated with a particular goal-state mechanism that operates as a state machine for driving the work inherent in executing the tenant job. Thus, the interaction managed by the tenant-change manager 580 may involve the following steps: scheduling the tenant job for the nodes X, Y, and Z of the update domain 305; determining the identity of the components 501, 502, and 503 hosted on the nodes X, Y, and Z; communicating an intent to execute the scheduled tenant job to the management roles 597-599 upon recognizing that the components 501, 502, and 503 include the role instances 521, 522, and 523, respectively, which are part of the service application 350; receiving from the management roles 597-599 a message that communicates information about internal states of the role instances 521, 522, and 523; and handling execution of the tenant job by considering the internal states of the role instances 521, 522, and 523. In operation, the internal states of the role instances 521, 522, and 523 guide the goal-state mechanism 510 as to how it should proceed when transitioning the nodes X, Y, and Z from the online condition to the offline condition.

By assigning the management roles 597-599 the responsibility of monitoring the internal states of the role instances 521-523, respectively, the tenant-change manager 580 is allowed to remain agnostic to specific details of the implementation of the service application 350 in order to operate efficiently. Thus, the management roles 597-599 in concert with the tenant-change manager 580 effectively introduce a general protocol between the fabric controller and the application 350 that can do all the following: provide sufficient information about the state of the service application 350 to the underlying platform to fulfill any application-management goals; provide visibility to the service application 350 of any ongoing maintenance activities initiated by the underlying platform; and provide the service application 350 an opportunity to properly time the platform-initiated activities.

The performance of an exemplary management role will now be described in detail with respect to the management roles 597-599 of FIG. 5. In general, the exemplary management role is programmed to understand internal state(s) stored locally at one or more role instances of the service application 350 and communicate this understanding during deployment of tenant jobs (e.g., maintenance, update, and recovery operations) throughout the underlying platform of the network 500. Accordingly, as used herein, the phrase "management role" broadly refers to component(s) of a service application that are responsible for monitoring and evaluating the internal states of the service application. Additionally, an exemplary management role may be responsible for coordinating operations with the fabric controller, which is involved in executing the tenant job.

Upon delegating these responsibilities to the management role, the fabric controller is provided with an accessible view into the internal state(s) that are local to role instances of the service application. Thus, the replications of role-instance internal states may be known and considered by the fabric controller. In effect, by collecting and distributing information that describes the role-instance internal states, the management role attempts to help guarantee that, when taking node(s) to an offline condition during a tenant job, the fabric controller will not take down all replicates of a particular internal state. Thus, inefficiencies that would be incurred upon the fabric controller directly monitoring the internal states of all role instances of all the stateful applications within the data center are ameliorated, yet, the internal states are still made visible to the fabric controller via the management role.

In one example, if the service application 350 has roles A (e.g., receives a set of digital images from customers), roles B (e.g., formats the digital images upon receipt), and roles C (e.g., presents the formatted digital images on a UI display), a fourth set of roles D may be created that tracks the internal states (e.g., specific customer data) of the instances in roles A, B, and C. Thus, the management roles D (e.g., management roles 597-599) have an intimate understanding of the internal details of the service application 350. For instance, the management roles D may know where each replica of a digital image is stored and whether the role instances (e.g., role instances 521-523) storing the digital image are presently available. Further, the management roles D may know a number of role instances that are individually locally storing that digital image.

In embodiments, the management roles 597-599 may be established by the following steps: identifying the service application 350 as a stateful application that the fabric controller has selected for instituting high visibility therewith; and designating one or more role instances (e.g., management roles 597-599) of the application 350 to incur the responsibility of understanding the internal state of other role instances (e.g., role instances 521-523) comprising the service application 350. Generally, from a service model standpoint, the management roles 597-599 represent regular service-application roles that are designated by a flag in the service-model definition. Further, upon establishment of the management roles 597-599, the service application 350 may configure one or more of the management roles 597-599 to monitor and report on the various independent parts of the service application 350.

Typically, the service application 350 is programmed to decide where to place the management roles 597-599 within a set of conditions enforced by the fabric controller. For instance, the fabric controller may impose the condition that two management roles cannot share the same node, thus, keeping the various role instances highly available. In this instance, with reference to FIG. 5, the management roles 597-599 are not established on the same nodes X, Y, and Z (e.g., physical machine or virtual machine) as the other role instances 521-523 (i.e., service-role instances v. management-role instances) being monitored.

Upon establishing and placing the management roles 597-599, the management roles 597-599 are generally enabled to influence the coordination of tenant jobs on the monitored role instances 521-523 by exposing the management roles' 597-599 understanding of their internal states to the tenant-change manager 580, which manages the implementation of the tenant jobs as discussed above. This understanding of the role-instance internal states may be achieved by crawling the role instances 521-523 and implementing arbitrarily complex logic that bases the understanding of the service application's 350 own availability on the number and location of replications of the internal states. Once the understanding of the internal states is known, this understanding is communicated to the tenant-change manager 530. In examples of schemes employed by the management roles 597-599 for communicating the understanding of the internal states of the role instances 521-523, the management roles 597-599 may evaluate the role instances 521-523 and communicate messages encapsulating the evaluation on demand from the tenant-change manager 580. Or, the processes of the evaluating and communicating may be carried out automatically by the management roles 597-599 (e.g., at predefined time periods or upon detecting a triggering event).

The tenant-change manager 580, in embodiments, may include various components for carrying out particular tasks associated with coordinating a tenant job. As illustrated at FIG. 5, exemplary components include an execution engine 520, a scheduling component 530, a tenant-job management component 540, and a job-compatibility component 550. The job-compatibility component 550 is configured to handle the preemption process of tenant jobs, where one job is of higher priority (deployed second) than another pending tenant job (deployed first). The tenant job management component 540 coordinates deployment of the tenant jobs, sends instructions to the scheduling component 530, and tracks the progress of the tenant jobs. The scheduling component 530 is generally responsible for scheduling the execution of tenant jobs while taking into account the types of pending tenant jobs being presently executed across the different service applications. Further, the scheduling component may be further configured for causing one or more tenant jobs to be interrupted by a high-priority job in accordance with a priority scheme (discussed below with reference to FIG. 6).

The execution engine 520, in embodiments, represents a general purpose finite state (FSM) machine that is configured to invoke the initiation and execution of tenant jobs. Typically, the execution engine 520 includes a framework that describes a set of steps that are conducted to perform work for a particular tenant job. The framework may also provide an ordering between the set of steps and links associated with proceeding from one step to another. These links relate to the conditions that should be satisfied when carrying out a first step prior to moving to another step. For instance, the execution engine 520 may read inputs and outputs from the scheduling component 530 and/or the goal-state mechanism 510 in order to drive state transitions of the update domain 305, where the completion of the state transitions at the update domain 305 allows for properly executing the tenant job thereon and progressing to the update domain 310.

In a particular embodiment, when acting as an FSM, the execution engine 520 is composed of a finite number of states associated to transitions (e.g., passive state and active state) of tenant jobs and transitions (e.g., online condition and offline condition) of role instances, where each transition includes a set of actions that starts at one state and ends in another state. A transition is typically initiated by a trigger, such as a detected event (e.g., write/store operation). In one instance, the trigger may include the receipt of an instruction from the scheduling component 530 prompting the execution engine 520 to carry out a tenant job on the update domains 305 and 310. Generally, the FSM allows for residing in just one state at a time, which is referred to herein as the current state of a pending tenant job.

The underlying platform of the network 500 involves additional components that assist the tenant-change manager 580 in intelligently deploying and executing a tenant job. These additional components may be encompassed by the scope of the fabric controller, or these components may exist separately from, yet supportive of, the fabric controller. In embodiments, the components of the underlying platform include, but are not limited to, the following: a root upgrade engine 590, goal-state mechanism 510, and a node-state driver 460.

The root upgrade engine 590 is generally designed to select a set of nodes (e.g., nodes A, B, and C of update domain 310 or nodes X, Y, and Z of update domain 305) that can be updated without violating predefined rules of the underlying platform or service model of the service application 350. For instance, the rules may ensure that a set of nodes selected for receiving the tenant job hosts roles instances that belong to no more than one update domain. Once the set of nodes is selected for receiving the tenant job, the set of selected nodes is proposed to the tenant-change manager 580 for guiding deployment of the tenant job.

The goal-state mechanism 510 is generally in communication with the management roles 597-599 and is configured to transition and persist the role instances 521-523 to an expected state as instructed by the execution engine 520. By way of example, during the preparation stage (see reference numeral 430 of FIG. 4) of the update domain 305, the expected state of the role instances 521-523 may be the offline condition 435. On the other hand, during the restore stage (see reference numeral 450 of FIG. 4) of the update domain 305, the expected state of the role instances 521-523 may be the online condition 455.

In one example of operation of the goal-state mechanism 510, the execution engine 520 and/or the scheduling component 530 may send instructions 560 to the goal-state mechanism 510 requesting that the goal-state mechanism 510 transition the update domain 305 to an expected state. As used herein, the phrase "expected state" generally represents a goal for the role instances 521-523 to assume an offline condition or online condition. Once the appropriate actions are taken to transition the role instances 521-523 to the expected state, actual state of the role instances 521-523 may be reported through a wire protocol (illustrated as dashed lines without arrows) to respective host agents (residing on common nodes as the role instances 521-523) that pass forward the actual state to the tenant-change manager 580. The tenant-change manager 580 may, in turn, pass the actual state of the tenant job to the goal-state mechanism 510, in order to assist the goal-state mechanism 510 in determining how to proceed with implementing the ongoing tenant job.

In another embodiment, upon the nodes X, Y, and Z of the update domain 305 reaching the expected state, the goal-state mechanism 510 may communicate the status of the role instances 521-523 with the management roles 597-599. In embodiments when the offline condition is the expected state, communication may include sending a first message that notifies the management roles 597-599 that the role instances 521-523 should be considered disabled such that the service application 350 is prepared to not count on using the role instances 521-523. In embodiments when the online condition is the expected state, communication may include sending a second message that notifies the management roles 597-599 that the role instances 521-523 should be considered enabled such that the service application 350 is able to rely on the role instances 521-523.

In some instances, the messages that convey the expected state are forwarded directly to a host agent running on respective root partitions of the nodes X, Y, and Z being affected by the tenant jobs. For instance, the messages may be sent to the host agent 615 of FIG. 6 prior to distributing the messages to the appropriate management roles 597-599. As such, the host agent functions to reveal the status of the role instances 521-523 to the service application 350. Further, by locally storing the messages on the nodes X, Y, and Z, the messages are able to survive a fabric-controller failover and/or the nodes hosting the management roles 597-599, respectively, being taken offline (e.g., during a reboot or repave operation). Accordingly, the underlying platform of the network 500 is designed to maintain consistent visibility to the messages regardless of the tenant jobs currently in progress.

In embodiments, the expected state that is persisted via the messages may be transferred to each of the nodes that host instances of the service application's 350 management roles. Then, the management roles 597-599 may implement a mechanism for periodic polling of the expected states of the update domains 305 and 310 by regularly inspecting the messages. These polls act to retrieve the expected states and other information and make it available to the service application 350.

Once the goal-state mechanism 510 sets and communicates the expected states, the node-state driver 460 is generally configured for disabling the role instance 521-523 to the offline condition, executing the tenant job, and restoring the role instances 521-523 to the online condition under the direction of the tenant-change manager 580, in accordance with the expected states.

Per embodiments of the present invention, the nodes may represent any form of computing device, such as, for example, a personal computer, a desktop computer, a laptop computer, a mobile device, a consumer electronic device, server(s), the computing device 100 of FIG. 1, and the like. Typically, the node includes, or is linked to, some form of a computing unit (e.g., central processing unit, microprocessor, etc.) to support operations of role instances and other components running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the nodes to enable each endpoint to perform a variety of processes and operations. In another instance, the computing unit may encompass a processor (not shown) coupled to the computer-readable medium accommodated by the nodes. Generally, the computer-readable medium stores, at least temporarily, a plurality of computer software components (e.g., role instances 521-523) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

As illustrated in FIG. 5, the nodes X, Y, and Z of the update domain 305 and the nodes A, B, and C of the update domain 310 each represent a virtual machine or a physical machine. When represented as a virtual machine, the nodes may include portions of the memory 112 of FIG. 1 and/or portions of the processors 114 of FIG. 1. As used herein, the phrase "virtual machine" is not meant to be limiting, and may refer to any software, application, operating system, or program that is executed by a processing unit to underlie the functionality of the service application. In embodiments, a virtual machine represents a respective guest partition of a node, where the guest partition is enabled to host the service application 350, or, at least, a portion thereof.

Generally, the service application 350 is owned by a tenant (e.g., customer) of the cloud-computing network 500 that hosts the service application 350 in a distributed manner. The node may further support a host agent (see reference numeral 615 of FIG. 6) running thereon. In embodiments, the host agent 615 resides on a root partition of the node, where the root partition is tasked with generally managing requests from the virtual machines, such as requests to implement disk I/O operations.

It should be understood and appreciated that the cloud-computing network 500, shown in FIG. 5, is merely an example of one suitable computing system environment and is not intended to suggest any limitation as to the scope of use or functionality of embodiments of the present invention. For instance, the cloud-computing network 500 may be a public cloud, a private cloud, or a dedicated cloud. Neither should the cloud-computing network 500 be interpreted as having any dependency or requirement related to any single component or combination of components illustrated therein. Further, although the various blocks of FIG. 5 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

The cloud-computing network 500 typically includes data centers configured to host and support operation of the role instances of distributed service applications owned by tenants/customers of the cloud-computing network 350. The phrase "service application," as used herein, broadly refers to any software, or portions of software, that runs on top of, or accesses storage locations within, the cloud-computing network 500. In one embodiment, the role instances (e.g., role instances 521-523) may represent a portion of software or a component program that participates in supporting functionality of the service application (e.g., service application 350). It will be understood and appreciated that each role instance shown in FIG. 5 is merely an example of a suitable part to support a service application and is not intended to suggest any limitation as to the scope of use or functionality of embodiments of the present invention.

Within the context of the cloud-computing network 500, the various components illustrated may communicate internally within the nodes, communicate across physical nodes through connections dynamically made that traverse a data center, and externally through a physical network topology to resources of a remote network (e.g., enterprise private network). The connections may involve interconnecting components distributed across physical resources of the data center via a network cloud (not shown). The network cloud interconnects these resources such that one component may recognize a location of another component in order to establish a communication therebetween. For instance, the network cloud may establish this communication over channels connecting role instances of a common service application. By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

Further, any number of components may be employed to achieve the desired functionality within the scope of embodiments of the present invention. Although the various components of FIG. 5 are shown with lines for the sake of clarity, in reality, delineating various components is not so clear, and metaphorically, the lines would more accurately be grey or fuzzy. Further, although some components of FIG. 5 are depicted as single blocks, the depictions are exemplary in nature and in number and are not to be construed as limiting (e.g., although only one execution engine 520 is shown, many more may be established in order to manage transitions associated with individual tenant jobs).

Prioritizing and Preempting Tenant Jobs

Figure 6:
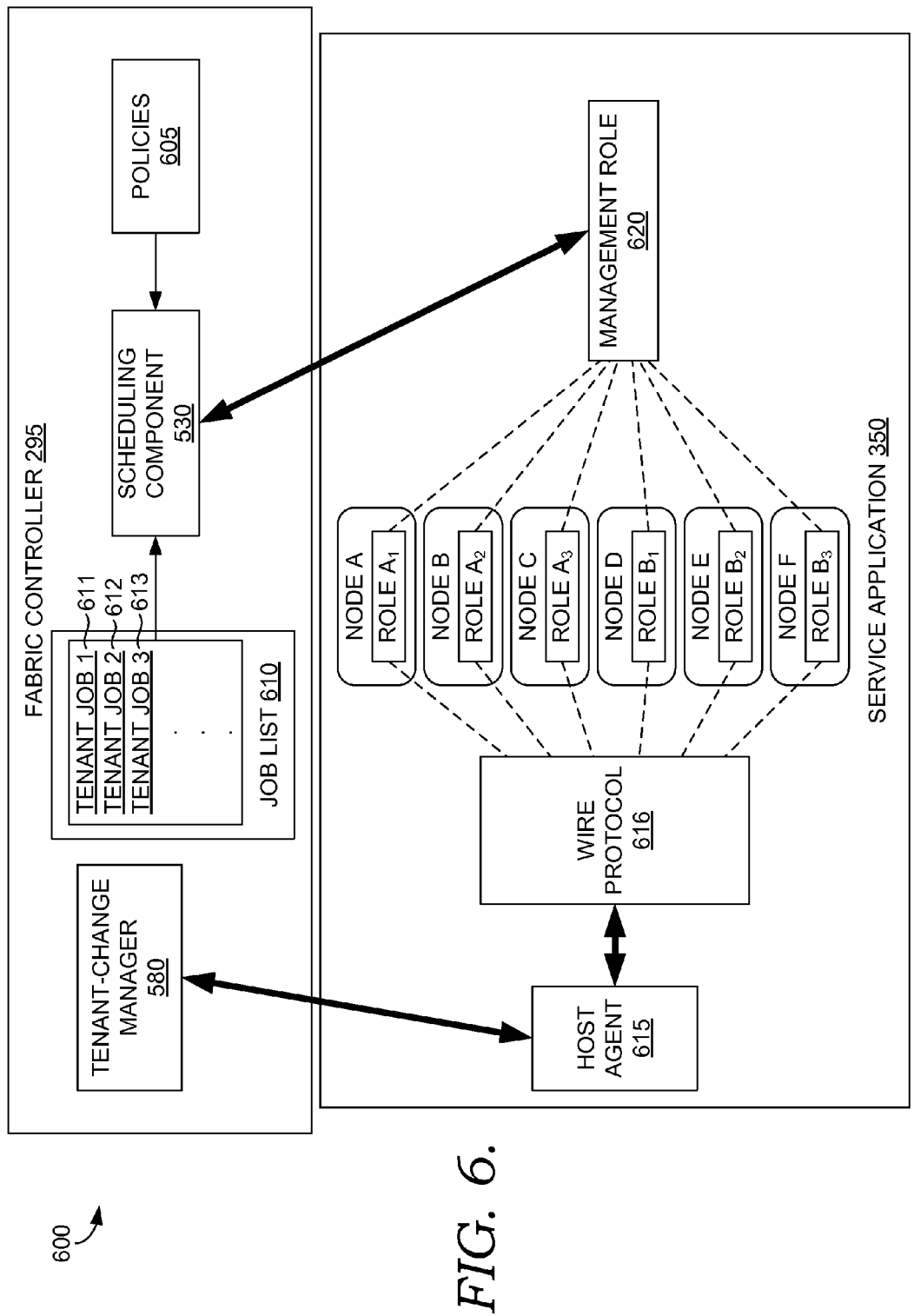
FIG. 6 is a graphical representation of an exemplary topology of the data center that depicts interactions between a fabric controller and a service application, in accordance with an embodiment of the present invention.

Turning now to FIG. 6, a graphical representation of an exemplary topology of the data center 600 that depicts interactions between the fabric controller 295 and the service application 350 is shown, in accordance with an embodiment of the present invention. Initially, the fabric controller 295 may maintain a job list 610 of the currently pending tenant jobs (e.g., tenant jobs 611-613). The scheduling component 530 is configured to inform at least one management role 620 of the service application 350 of those currently active and pending tenant jobs that affect the service application 350, as well as any relevant modifications that occur within the job list 610 (e.g., reordering of the tenant jobs 611-613 or preemption of the pending tenant job).

Occasionally, as mentioned above, a high-priority job may be issued while a tenant job is currently pending and deployed in the active state. Policies 605 that govern how to deal with the high-priority job are available to the scheduling component 530, where differing policies 605 may result in different manners for carrying out the tenant jobs. In operation, the policies 605 govern the scheduling component's 530 reaction (e.g., timeouts and cancelation messages) to a conflict surrounding the tenant jobs 611-613. In embodiments, the reaction is driven by tenant-job factors that are revealed by the policies 605.

One of these factors relates to the type of entity that initiated the tenant job. Tenant jobs may be divided into two categories: application- or customer-initiated and infrastructure-initiated. When a customer initiates a tenant job (e.g., version update) to their service application 350, this tenant job is placed in the job list 610 and is exposed to the management role 620. Once the customer-initiated tenant job is initiated (e.g., upon reaching the top of the order of the job list 610), the fabric controller 295 may query the management role 620 to determine whether another tenant job is currently pending on the role instances targeted by the customer-initiated tenant job. If an infrastructure-initiated tenant job (e.g., maintenance operations initiated internally by the underlying platform or installation of a new root operating-system version that includes a reboot of the affected nodes) is presently deployed on the targeted role instances, the customer-initiated tenant job is placed on hold (transition to suspended state) or terminated entirely (transition to canceled state).

When an infrastructure initiates a tenant job to the service application 350, this job may either be placed in the job list 610 or assigned a high priority and deployed immediately. Upon detecting the deployment of the infrastructure-initiated tenant job, the fabric controller 295 may query the management role 620 to determine whether another tenant job is currently pending on the role instances targeted by the infrastructure-initiated tenant job. If a customer-initiated tenant job is presently deployed on the targeted role instances, several steps may occur. One step involves determining whether the customer-initiated tenant job is granted any privileges that may rank it higher in priority than the infrastructure-initiated tenant job. If no privileges are granted, another step involves preempting the customer-initiated tenant job. In embodiments, preemption includes causing the customer-initiated tenant job to temporarily stop work (transition to passive state) while allowing the infrastructure-initiated tenant job to commence (transition to active state). Thus, the pending customer-initiated tenant job will not block the infrastructure-initiated tenant job.

In other embodiments, the scheduling component 530 is configured for building the job list 610 and invoking the execution of a particular tenant job as is reaches a top of the job list 610. When building the job list 610, the scheduling component 530 may rely on a prioritization scheme to generate an ordering of tenant jobs within the job list 610. Further, the scheduling component 530 is configured for selecting a proper tenant job for immediate execution when there exists a conflict between two or more tenant jobs that target a common node. The selection may be based upon consulting the prioritization scheme and ascertaining which of the tenant jobs should be initiated first in accordance with the prioritization scheme. Typically, the prioritization scheme incorporates the policies 605 established by the underlying platform.

An exemplary process for employing the prioritization scheme will now be discussed. Initially, a new tenant job arrives at the scheduling component 530 while a pending tenant job is being executed at a subject role instance. At this point, the new tenant job is in the passive state, the pending tenant job is in the active state, and the subject role instance is in the offline condition. A priority of the new tenant job may be determined from the priority scheme. If the determined priority is lower than the pending tenant job, the scheduling component 530 may continue execution of the pending tenant job (remains in the active state) while inserting the new tenant job (remains in the passive state) within a queue of the tenant jobs 611-613 of the job list 610 in accordance with the determined priority.

If, however, the determined priority is higher than the pending tenant job, the scheduling component 530 may preempt execution of the pending tenant job by performing arbitration actions of a job-preemption sequence thereon. These arbitration actions may involve transitioning the pending tenant job to a passive state and the new tenant job to an active state. When transitioning the pending tenant job to the passive state, the scheduling component's 530 goal is to bring the subject role instance from the current offline condition to an online condition as quickly as possible. To this end, execution of the pending tenant job is either put on hold at the subject role instance, or allowed to finish execution (e.g., performing work stage 440 of FIG. 4) and exit through a well-defined, state-transition path. When the pending tenant job is put on hold, the new tenant job is executed on the subject role instance and, upon completing execution of the new tenant job, the previously pending tenant job is resumed on the subject role instance at the point of interruption.

In instances when the scheduling component 530 allows the pending tenant job to finish execution on the subject role instance, a timeout logic may be enforced in order to ensure the pending tenant job finishes in a predefined amount of time. In operation, upon the subject role instance failing to assume an online condition before expiration of the predefined amount of time, timeout logic may force the pending tenant job to stop execution prematurely in order to cease blocking deployment of the new tenant job. However, an advantage of the timeout logic is to allow a current stage (e.g., stages 430, 440, and 450 of FIG. 4) of the pending tenant job to run to completion on the subject role instance without interruption, thus, leaving the service application 350 in a consistent state during preemption.

In an exemplary embodiment, the predefined amount of time allocated by the timeout logic to wrap up the pending tenant job may vary based, in part, on a privilege level assigned to service application(s) targeted by the new tenant job of higher priority. In other words, a privilege level generally represents a level at which service-application behavior is allowed to affect the time waited by the fabric controller 295 before suspending the pending tenant job. In instances, service application(s) that are assigned a high-privilege level may be allocated a longer amount of time to finish to the "prepare" and "restore" stages as opposed to the short amount of time allocated to service application(s) that are assigned a low privilege-level. For example, a key internal application may be granted a higher level of privilege than a third-party hosted application. These privilege levels may be modified upon an administrator of the underlying platform establishing the policies 605 for executing tenant jobs. In another embodiment, the privilege levels assigned to service application(s) may be used for controlling other operations, such as when to generate operational alarms in case of tenant-job failure.

Although various embodiments of actions that are carried out in the event of a preemption are discussed above, it should be appreciated and understood that different priorities of tenant jobs may handled differently and may invoke alternative actions at the scheduling component 530.

When implementing tenant jobs on the service application 350, the fabric controller 295 may expose runtime health information of the service application's 350 role instances to the management role 620. This health information may be made available to the management role 620 via a message (e.g., XML document) with a timestamp that the fabric controller 295 publishes to instances of the host agent 615, which is then served to the service application 350 via a wire protocol 616. In general, the wire protocol 616 conveys communications between the host agent 615 and the roles of the service application 350. As illustrated in FIG. 6, typically there is a one-to-one correspondence between wire protocol 616 and host agent 615.

In embodiments, the process of making the health information available involves querying the role instances of the service application 350, which, in turn, report their health information to the fabric controller 350, and aggregating the health information before allowing the management role 620 to review the message. Upon reviewing the message, the management role 620 may detect one or more role instances that have experienced an issue (e.g., failing to return to an online condition) and conduct remedial actions (e.g., requesting the fabric controller 295 to reboot the failed role instances). As such, understanding the health information of the role instances allows the management role 620 to assess the results of a tenant job and/or compute whether to proceed to the next stage of the tenant job.

Health information, in embodiments, may also encompass internal-state information that describes the presence(s) of a particular internal state at the role instance(s) of the service application 350. Generally, the internal-state information may be used to influence the timing of when the fabric controller 295 initiates a tenant job on a portion of the service application 350. As illustrated in FIG. 6 for demonstrative purposes only, if the service application 350 includes three instances of role A ($A_1$, $A_2$, and $A_3$) and three instances of role B ($B_1$, $B_2$, and $B_3$), the internal-state information may describe which instances of role A locally store a first internal state and which instances of role B locally store a second internal state. When the tenant-change manager 580 communicates to the management role 620 an indication of those role instances that are targeted to assume an offline condition, upon deploying a particular phase of a pending tenant job, the management role 620 may consult the health information to determine whether it is safe to take the targeted role instances to the offline condition.

For example, the management role 620 may consult the health information to determine whether the first internal state is replicated at two or more instances of role A and whether the second internal state is replicated at two or more instances of role B when asked for feedback regarding taking role instance $A_1$ (maintaining the first internal state) and $B_1$ (maintaining the second internal state) to an offline condition. When internal-state information reveals that the first and second internal states are replicated outside the targeted role instances ($A_1$ and $B_1$), the management role 620 may signal that the pending tenant job may be deployed as scheduled. However, when internal-state information reveals that the first and second internal states are not replicated outside the targeted role instances ($A_1$ and $B_1$), the management role 620 may request that the pending tenant job be delayed in order to replicate the first and second internal states on one or more of the role instances $A_2$, $A_3$, $B_2$, and $B_3$, respectively. This delay allows the management role 620 time to preserve the availability of the first and second internal states. As mentioned above, the requested delay is considered by the fabric controller 295, but not always granted (e.g., based on a priority of the pending tenant job).

Process Flows

Figure 7:
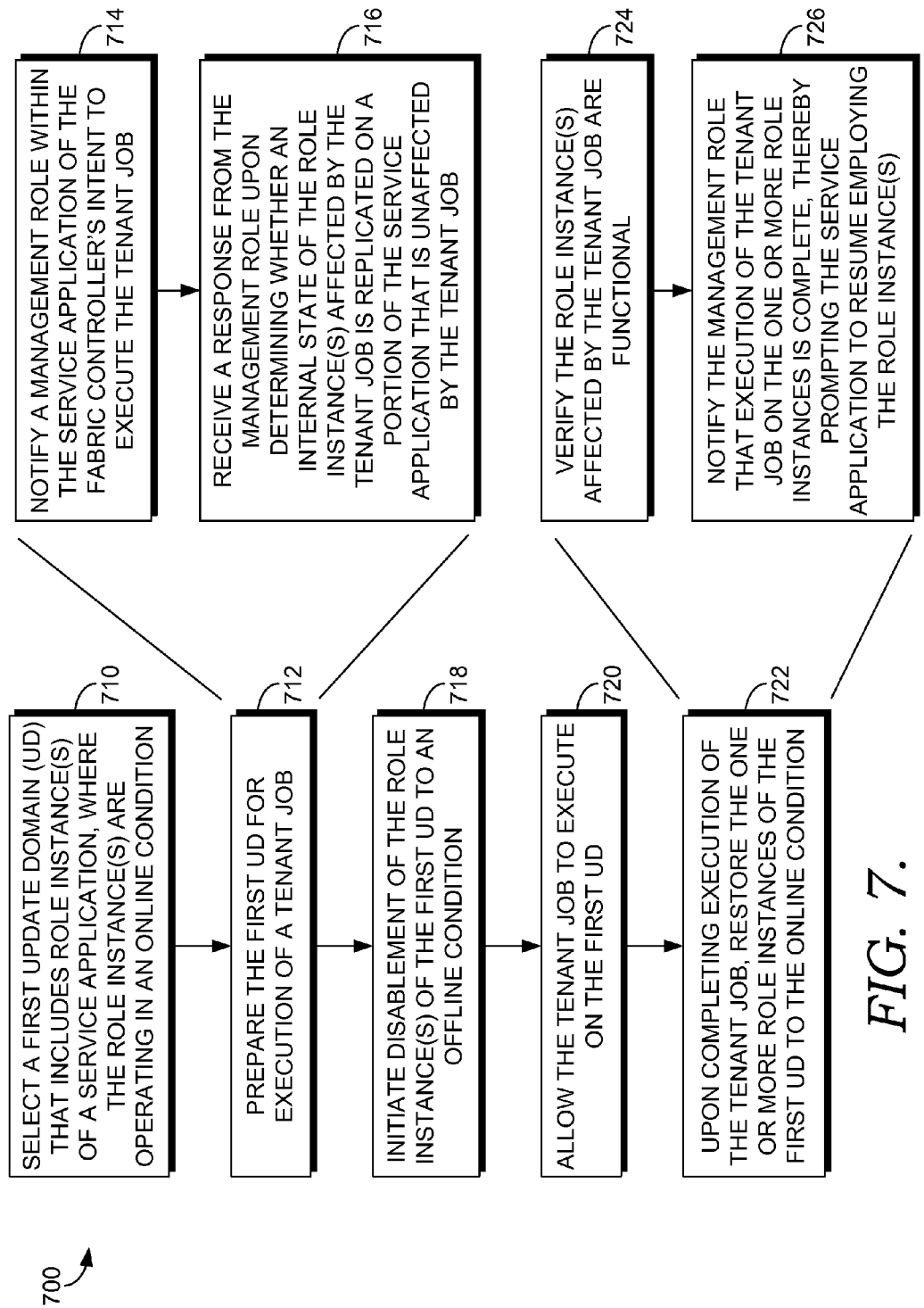
FIG. 7 is a flow diagram showing an overall method for facilitating interaction between the fabric controller of the cloud-computing network and the service application, in accordance with an embodiment of the present invention.

Referring now to FIG. 7, a flow diagram is shown that illustrates an overall method 700 for facilitating interaction between the fabric controller of the cloud-computing network and the service application, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. The method 700 may initially involve selecting a first update domain (UD) that includes one or more role instances of the service application, as indicated at block 710. Typically, the role instances are operating in an online condition and represent respective component programs (e.g., a single replication of a role of the service application) that support the functionality of the service application.

The method 700 may further involve preparing the first UD for execution of a tenant job (e.g., platform-initiated update, a customer-initiated update, a platform-initiated repair, or a customer-initiated repair), as indicated at block 712. In an exemplary embodiment, preparing the first UD includes at least the following steps: notifying a management role within the service application of the fabric controller's intent to execute the tenant job (see block 714); and receiving a response from the management role upon determining whether an internal state of the role instance(s) affected by the tenant job is replicated on a portion of the service application that is unaffected by the tenant job (see block 716). Upon preparing the role instance(s) of the first UD, disablement of these role instance(s) to an offline condition is initiated, as indicated at block 718. Generally, disabling the role instance(s) involves rendering inoperative a set of nodes that host the one or more role instances within the first UD. The tenant job is allowed to execute on the first UD once the role instance(s) have assumed the offline condition, as indicated at block 720.

Further yet, the method 700 may involve restoring the role instance(s) of the first UD to the online condition upon completing execution of the tenant job, as indicated at block 722. In an exemplary embodiment, restoring the instance(s) of the first UD to the online condition includes at least the following steps: verifying the role instance(s) affected by the tenant job are functional (see block 724); and notifying the management role that execution of the tenant job on the role instance(s) is complete (see block 726), thus, prompting the service application to resume employing the role instance(s) for carrying out tasks. Generally, restoring the role instance(s) within the first UD to the online condition also involves rendering operative the set of nodes that host the role instance(s). Upon restoring the role instance(s) within the first UD to the online condition, the method 700 may continue by selecting a second UD of role instances for running the tenant job thereon. Typically, the first UD and the second UD are mutually exclusive in membership and each may represent a discrete phase in propagating the tenant job throughout the cloud-computing network.

Turning now to FIG. 8, a flow diagram is illustrated showing an overall method 800 for scheduling a high-priority job when executing a tenant job, in accordance with an embodiment of the present invention. The method 800 involves receiving an indication to execute the tenant job on a service application (see block 810) and identifying an update domain (UD) that includes one or more role instances of the service application (see block 812). At this time, the role instance(s) are operating in an online condition. The UD is prepared for execution of the tenant job (see block 814) and, subsequently, the instance(s) of the UD are disabled to an offline condition (see block 816). In an exemplary embodiment, the process of preparing the UD for execution of the tenant job involves various logical steps including the following: notifying a management role within the service application of an intent to execute the tenant job; and either receiving a positive response from the management role or receiving a negative response from the management role.

At some later point, an indication to implement a high-priority job is received, as indicated at block 818. As used herein, the phrase "high-priority" is not meant to be limiting, but may represent any job that is predetermined to preempt the tenant job within a priority scheme. Upon receipt of the indication to implement the high-priority job, as indicated at block 820, deployment of the tenant job is yielded to the high-priority job. In an exemplary embodiment, the process of yielding involves various logical steps including the following: instructing the service application to perform a truncated set of operations that restore the role instance(s) to the online condition (see block 822); placing the tenant job on hold (see block 824); and initiating execution of the high-priority job on the role instance(s) (see block 826).

Upon completing execution of the high-priority job, deployment of the tenant job is resumed, as indicated at block 828. In an exemplary embodiment, the process of resuming involves various logical steps including the following: reinitiating disablement of the role instance(s) of the UD to the offline condition (see block 830); and allowing execution of the tenant job on the role instance(s) (see block 832). Once the execution of the tenant job is completed, the role instance(s) of the UD may be restored to the online condition, as indicated at block 834. In an exemplary embodiment, the process of restoring the role instance(s) to the online condition involves various logical steps including the following: verifying the role instance(s) affected by the tenant job are functional; and notifying the management role that execution of the tenant job on the role instance(s) is complete, thus, prompting the service application to resume employing the role instance(s) to carry out various tasks.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. One or more computer-readable hardware memory having computer-executable instructions embodied thereon that, when executed, perform a method for facilitating interaction between a fabric controller of a cloud-computing network and a service application running in the cloud-computing network, the method comprising:
   selecting a first update domain (UD) that includes one or more role instances of the service application, wherein the one or more role instances are operating in an online condition;
   preparing the first UD for execution of a tenant job, wherein preparing the first UD comprises:
      (a) notifying a management role within the service application of the fabric controller's intent to execute the tenant job; and
      (b) receiving a response from the management role upon determining whether an internal state of the one or more role instances affected by the tenant job is replicated on a portion of the service application that is unaffected by the tenant job;
   initiating disablement of the one or more role instances of the first UD to an offline condition; and
   allowing the tenant job to execute on the first UD.

2. The computer-readable hardware memory of claim 1, the method further comprising, upon completing execution of the tenant job, restoring the one or more role instances of the first UD to the online condition.

3. The computer-readable hardware memory of claim 2, wherein restoring the one or more role instances of the first UD to the online condition comprises:
   verifying the one or more role instances affected by the tenant job are functional; and
   notifying the management role that execution of the tenant job on the one or more role instances is complete, thereby prompting the service application to resume employing the one or more role instances.

4. The computer-readable hardware memory of claim 2, wherein disabling the one or more role instances to an offline condition involves rendering inoperative a set of nodes that host the one or more role instances within the first UD.

5. The computer-readable hardware memory of claim 4, wherein restoring the one or more role instances to the online condition involves rendering operative the set of nodes that host the one or more role instances within the first UD.

6. The computer-readable hardware memory of claim 5, wherein each of the set of nodes represents a physical machine or a virtual machine capable of running the one or more role instances of the service application, and wherein the role instances represent respective component programs that support the functionality of the service application.

7. The computer-readable hardware memory of claim 1, wherein the method further comprises selecting a second UD of role instances for running the tenant job thereon, wherein the first UD and the second UD are mutually exclusive in membership and each represents a discrete phase in propagating the tenant job throughout the cloud-computing network.

8. The computer-readable hardware memory of claim 5, wherein the tenant job comprises at least one of a platform-initiated update, a customer-initiated update, a platform-initiated repair, or a customer-initiated repair.

9. The computer-readable hardware memory of claim 1, wherein preparing the first UD further comprises allowing the management role to gather additional information by interacting with fabric controller.

10. A computerized method for scheduling a high-priority job when executing a tenant job, the method comprising:
    receiving an indication to execute the tenant job on a service application;
    identifying an update domain (UD) that includes one or more role instances of the service application, wherein the one or more role instances are operating in an online condition;
    preparing the UD for execution of the tenant job;
    initiating disablement of the one or more role instances of the UD to an offline condition;
    receiving an indication to implement a high-priority job, wherein the high-priority job is predetermined to preempt the tenant job within a priority scheme;
    yielding deployment of the tenant job to the high-priority job, wherein the process of yielding comprises:
       (a) instructing the service application to perform a truncated set of operations that restore the one or more role instances to the online condition;
       (b) placing the tenant job on hold; and
       (c) initiating execution of the high-priority job on the one or more role instances;
    upon completing execution of the high-priority job, resuming deployment of the tenant job, wherein the process of resuming comprises:
       (a) reinitiating disablement of the one or more role instances of the UD to the offline condition; and
       (b) allowing execution of the tenant job on the one or more role instances; and
    upon completing execution of the tenant job, restoring the one or more role instances of the UD to the online condition.

11. The computerized method of claim 10, wherein preparing the UD for execution of the tenant job comprises:
    notifying a management role within the service application of an intent to execute the tenant job; and
    receiving a positive response from the management role upon determining the internal state of the one or more role instances affected by the tenant job is replicated on a portion of the service application that is unaffected by the tenant job; or
    receiving a negative response from the management role upon determining that the internal state of the one or more role instances affected by the tenant job is confined to the one or more role instances.

12. The computerized method of claim 11, further comprising, upon receiving the positive response from the management role, allowing the tenant job to execute on the one or more role instances.

13. The computerized method of claim 11, further comprising, upon receiving the negative response from the management role:
    when the indication to execute the tenant job is customer-initiated, delaying execution of the tenant job on the one or more role instances in order to allow for replication of the internal state; and
    when the indication to execute the tenant job is platform-initiated, proceeding with execution of the tenant job on the one or more role instances.

14. The computerized method of claim 11, wherein restoring the one or more role instances of the UD to the online condition comprises:

verifying the one or more role instances affected by the tenant job are functional; and notifying the management role that execution of the tenant job on the one or more role instances is complete, thereby prompting the service application to resume employing the one or more role instances.

15. The computerized method of claim 10, wherein the process of yielding further comprises:

transitioning the tenant job to a passive state; and transitioning the high-priority job to an active state.

16. The computerized method of claim 10, wherein resuming deployment of the tenant job further comprises transitioning the tenant job to the active state.

17. A computer system for performing a method that coordinates the incremental deployment of a tenant job to portions of a service application, the computer system comprising a processing unit coupled to a computer storage medium, the computer storage medium having stored thereon a plurality of computer software components executable by the processing unit, the computer software components comprising:

one or more role instances of the service application, wherein the role instances represent the component programs that support the functionality of the service application;

a tenant-change manager for directing deployment of the tenant job, wherein the process of directing deployment involves communicating an indication of the deployment of the tenant job, initiating disablement of the one or more role instances to an offline condition, allowing for execution of the tenant job on the one or more role instances, and initiating restoration of the one or more role instances to the online condition; and a management role of the service application for monitoring an internal state of the one or more role instances, wherein, upon receiving the indication of the deployment of the tenant job, the management role is responsible for determining whether the monitored internal state of the one or more role instances affected by the tenant job is replicated on a portion of the service application that is unaffected by the tenant job and for communicating an indication of availability of the internal state to the tenant-change manager.

18. The computer system of claim 17, further comprising a host agent residing on a node that hosts the one or more role instances, wherein the host agent reveals an expected state of the one or more role instances to the service application, wherein the expected state represents the offline condition or the online condition of the one or more role instances, and wherein the node represents a physical machine or a virtual machine within a data center.

19. The computer system of claim 17, further comprising a scheduling component for causing the tenant job to be interrupted by a high-priority job in accordance with a priority scheme.

20. The computer system of claim 17, further comprising a node-state driver for disabling the one or more role instances to the offline condition, executing the tenant job, and restoring the one or more role instances to the online condition under the direction of the tenant-change manager.

* * * * *